(12) United States Patent
Shanbhogue

(10) Patent No.: US 7,178,056 B2
(45) Date of Patent: Feb. 13, 2007

(54) ROLLING SOFTWARE UPGRADES FOR FAULT TOLERANT SYSTEMS

(75) Inventor: Vedvyas Shanbhogue, Los Angeles, CA (US)

(73) Assignee: Intel Corporation, Santa Clara, CA (US)

( * ) Notice: Subject to any disclaimer, the term of this patent is extended or adjusted under 35 U.S.C. 154(b) by 574 days.

(21) Appl. No.: 10/000,335

(22) Filed: Dec. 4, 2001

(65) Prior Publication Data

US 2003/0105988 A1 Jun. 5, 2003

(51) Int. Cl.
G06F 11/00 (2006.01)
(52) U.S. Cl. .................. 714/7; 714/6; 714/12; 714/13
(58) Field of Classification Search .............. 714/6, 714/7, 12, 13; 717/170, 171
See application file for complete search history.

(56) References Cited

U.S. PATENT DOCUMENTS 5,966,304 A * 10/1999 Cook et al. .................. 700/82
6,378,027 B1 * 4/2002 Bealkowski et al. ........ 710/302
6,463,501 B1 * 10/2002 Kern et al. .................. 711/100
6,684,396 B1 * 1/2004 Brittain et al. .............. 717/168

OTHER PUBLICATIONS

Harry Singh, "Distributed Fault-Tolerant/High-Availability Systems," 2001 Trillium Digital Systems, Inc., pp. 1-20.

* cited by examiner

Primary Examiner—Scott Baderman
Assistant Examiner—Timothy M. Bonura
(74) Attorney, Agent, or Firm—Kenyon & Kenyon LLP

(57) ABSTRACT

Application software on a fault tolerant system having an active engine and a standby engine is upgraded. As part of the upgrade, the system determines if the active engine and the standby engine are executing different versions of the application software. The system sends a description of work units from the active engine to the standby engine and sends database activities from the active engine to the standby engine.

16 Claims, 6 Drawing Sheets

ROLLING SOFTWARE UPGRADES FOR FAULT TOLERANT SYSTEMS

FIELD OF THE INVENTION

The present invention is directed to fault tolerant systems. More particularly, the present invention is directed to software upgrades to fault tolerant systems.

BACKGROUND INFORMATION

As computer systems, network systems and software systems become more complex and capital intensive, system failures become more and more unacceptable. This is true even if the system failures are minor. Generally, when systems fail, data is lost, applications become inaccessible, and computer downtime increases. Reducing system failures is often a major goal for companies that wish to provide quality performance and product reliability in the computer systems, network systems and/or software systems which they operate. As such, these systems must be highly dependable. Fault tolerance has been implemented as a way of achieving dependability.

For a system to be fault tolerant, it must be able to detect, diagnose, confine, mask, compensate, and/or recover from faults. In general, there are three levels at which fault tolerance may be applied: hardware level, software level and system level. In the hardware level, fault tolerance is often achieved by managing extra hardware resources, through redundant communications, additional memory, duplicate processors, redundant power supply, etc. In the software level, computer software is structured to compensate for faults resulting from changes in data structures or applications because of transient errors, design inaccuracies, or outside attacks. In the system level, system fault tolerance provides functions that compensate for failures that are generally not computer-based. For example, application-specific software may detect and compensate for failures in sensors, actuators, or transducers.

Even in the hardware level and the system level, application software is generally utilized to control, provide and/or assist in the detection and recovering of fault. As such, it is essential that to achieve system fault tolerance, application software itself must be fault tolerant. Hardware is generally a couple of orders of magnitude more reliable than software, and the majority of the failures in today's systems that incorporate software applications are in fact typically caused by software problems.

Fault tolerance is typically achieved in application software by either the underlying operating system and hardware or by customizing the application to operate in an active/standby redundant configuration. However, when an application uses the underlying operating system and hardware to achieve fault tolerance, it becomes dependent upon, or "tied down" to that operating system and hardware platform.

Application software in most systems are required to be upgraded from time to time to upgrade the software by incorporating new features or fix bugs. Most current mechanisms of upgrading software involve shutting down the system and reloading the system with the upgraded software. Known mechanisms to perform software upgrades without shutting down the system are also typically based on the characteristics and capabilities of the platform on which these mechanisms are implemented.

Based on the foregoing, there is a need for an improved system and method that allows software on a fault tolerant system to be upgraded without shutting down the system.

DETAILED DESCRIPTION

One embodiment of the present invention is a fault tolerant system in which fault tolerant application software is upgraded using a rolling upgrade method. During the upgrading, upgraded and non-upgraded copies of the application software co-exist in the system while the upgraded version of the software is being validated for performance.

One embodiment of the present invention is implemented on a fault tolerant system in which applications are made fault tolerant using a hot standby mechanism. An example of such fault tolerant systems and applications is disclosed in U.S. patent application Ser. No. 09/967,623, entitled "System and Method for Creating Fault Tolerant Applications", filed on Sep. 28, 2001 and assigned to Intel Corp.

Figure 1:
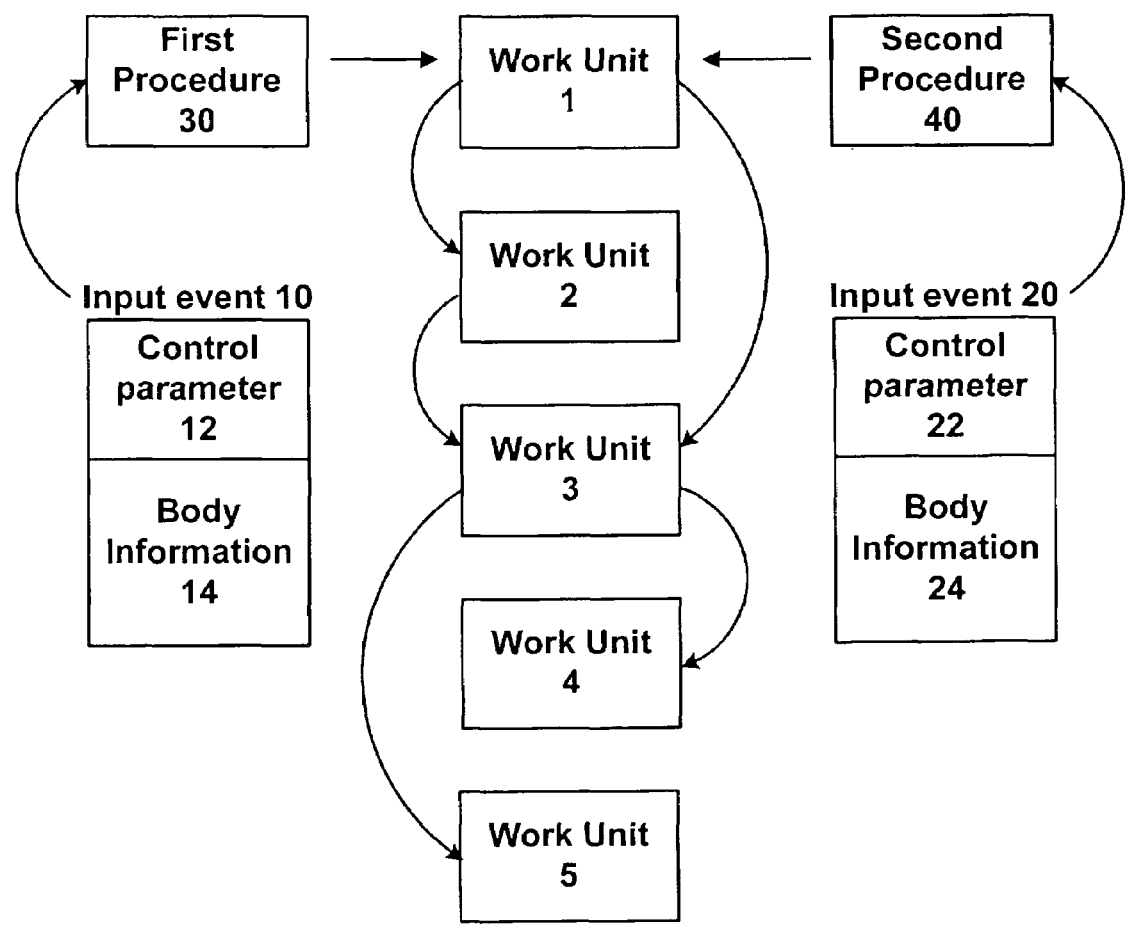
FIG. 1 is a block diagram that illustrates a software application that is to be made fault tolerant according to an embodiment of the present invention.

In one embodiment, an application to be made fault tolerant is designed as a collection of "work units," which may be indivisible atomic units. FIG. 1 is a block diagram that illustrates a software application that is to be made fault tolerant according to an embodiment of the present invention. The software application of FIG. 1 receives a first set of input events 10 and a second set of input events 20, triggers a first procedure 30 and a second procedure 40, respectively, and invokes any one of work units 1–5 in a prescribed sequence. The input events to the application may, for example, be any event received from the environment outside of the application, which includes timer ticks, interrupts, user inputs and signals from the hardware. The input events may also be messages from other applications in the system or outside the system.

In one embodiment, input events 10, 20 are further divided into control parameter parts 12, 22 and body information parts 14, 24. The control parameter part of an input event comprises information in the input event that is used to determine the gist of the input event. For example, one may use the control parameters to determine the identity of the input event, the source location of the input event and the actions to be performed on, or because of, the input event. The body information part may contain other ancillary and supporting information in the input event. Generally, the body information part is much larger than the control parameter part in terms of size because the body information is data-ridden.

The input events received by the application trigger one or more procedures, which in turn trigger the procedures' corresponding sequence of work units. The work units may, for example, be coded in a high level language as invokeable functions. In other embodiments, the work units may also be coded in other type of programming language. As shown in FIG. 1, multiple work units are sequenced and grouped together to form procedures that are implemented by the software application. For example, in response to the first set of input events 10, the application invokes the first procedure 30, which in turn triggers work unit 1, work unit 2, work unit 3, and work unit 5 in sequence. On the other hand, when the application receives second set of input events 20, the application invokes second procedure 40, which in turn triggers work unit 1, work unit 3 and work unit 4 in sequence.

Figure 2:
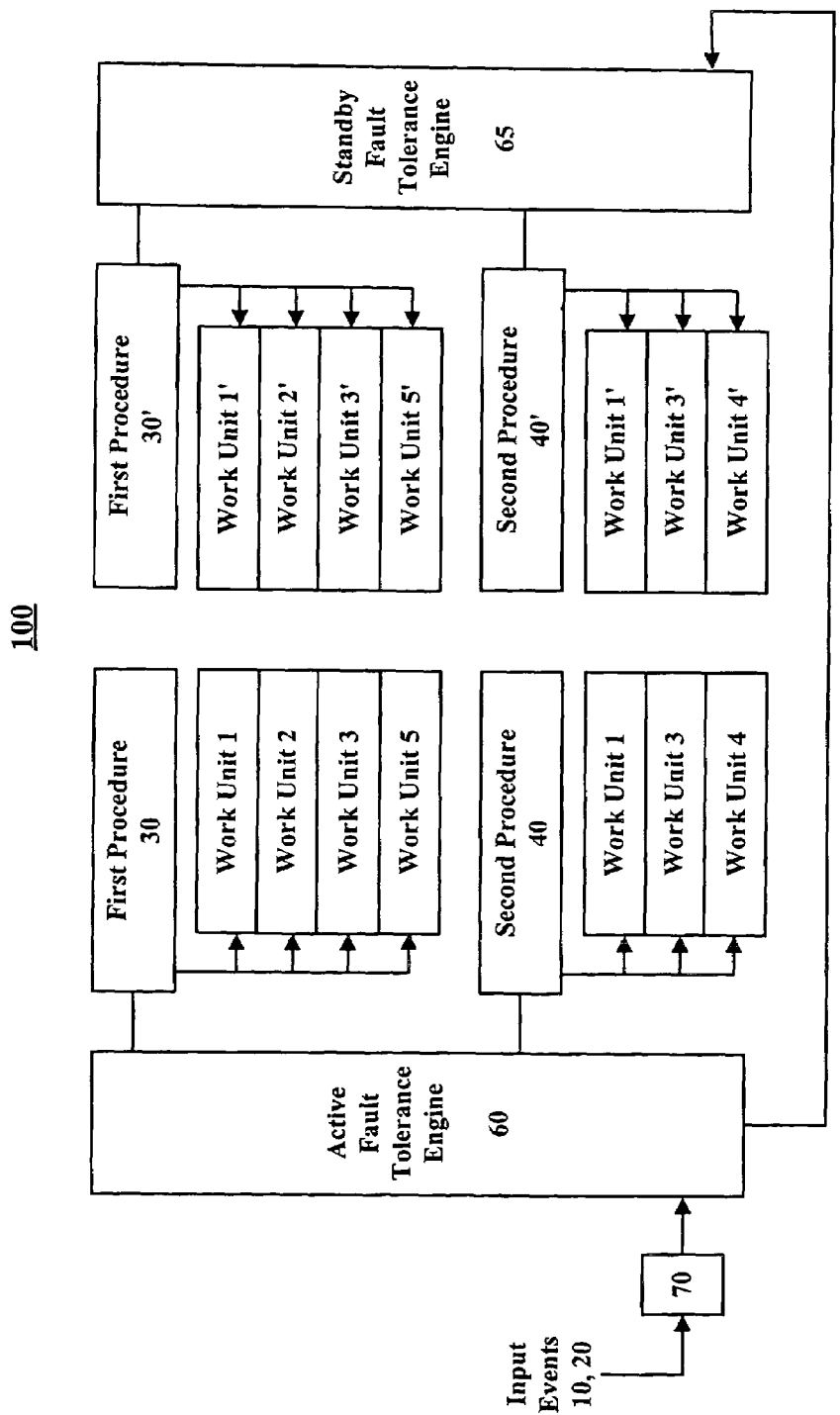
FIG. 2 is a block diagram of one embodiment of a fault tolerant system that can be used to implement the present invention.

FIG. 2 is a block diagram of one embodiment of a fault tolerant system 100 that can be used to implement the present invention. Fault tolerant system 100 includes an active fault tolerance ("FT") engine 60, a standby FT engine 65, and an application in active/standby redundant pair configuration. The application implements a number of procedures in response to input events that it receives, where each of the procedure is formed by sequencing and grouping a number of work units together. In some instances, a procedure may consist of only one work unit. For simplicity, only two procedures are shown in FIG. 2, a first procedure 30 and a second procedure 40. The two procedures 30, 40 are started on the active FT engine side. When invoked, first procedure 30 triggers its corresponding work units 1, 2, 3, 5 in sequence, while second procedure 40 triggers its corresponding work units 1, 3, 4 in sequence. In order to make the application fault tolerant, a second copy of the application is started on the standby FT engine side to form a redundant pair.

As shown in FIG. 2, the second copy of the application comprises a first procedure 30' and a second procedure 40', where work units 1', 2', 3', 5' are triggered in sequence when the first procedure 30' is invoked and work units 1', 3', 4' are triggered in sequence when the second procedure 40' is invoked. In this configuration, the active and standby FT engines 60, 65 are able to synchronize with one another in a lock-step fashion to achieve hot standby fault tolerance. Although the symbol prime (') is used to indicate the procedures and work units at the standby side, it is noted that the procedures and work units on the active side are the same as the procedures and work units on the standby side. However, in some embodiments, different programming codes may be used to implement procedures and work units on the active side and the counterparts on the standby side.

Figure 3:
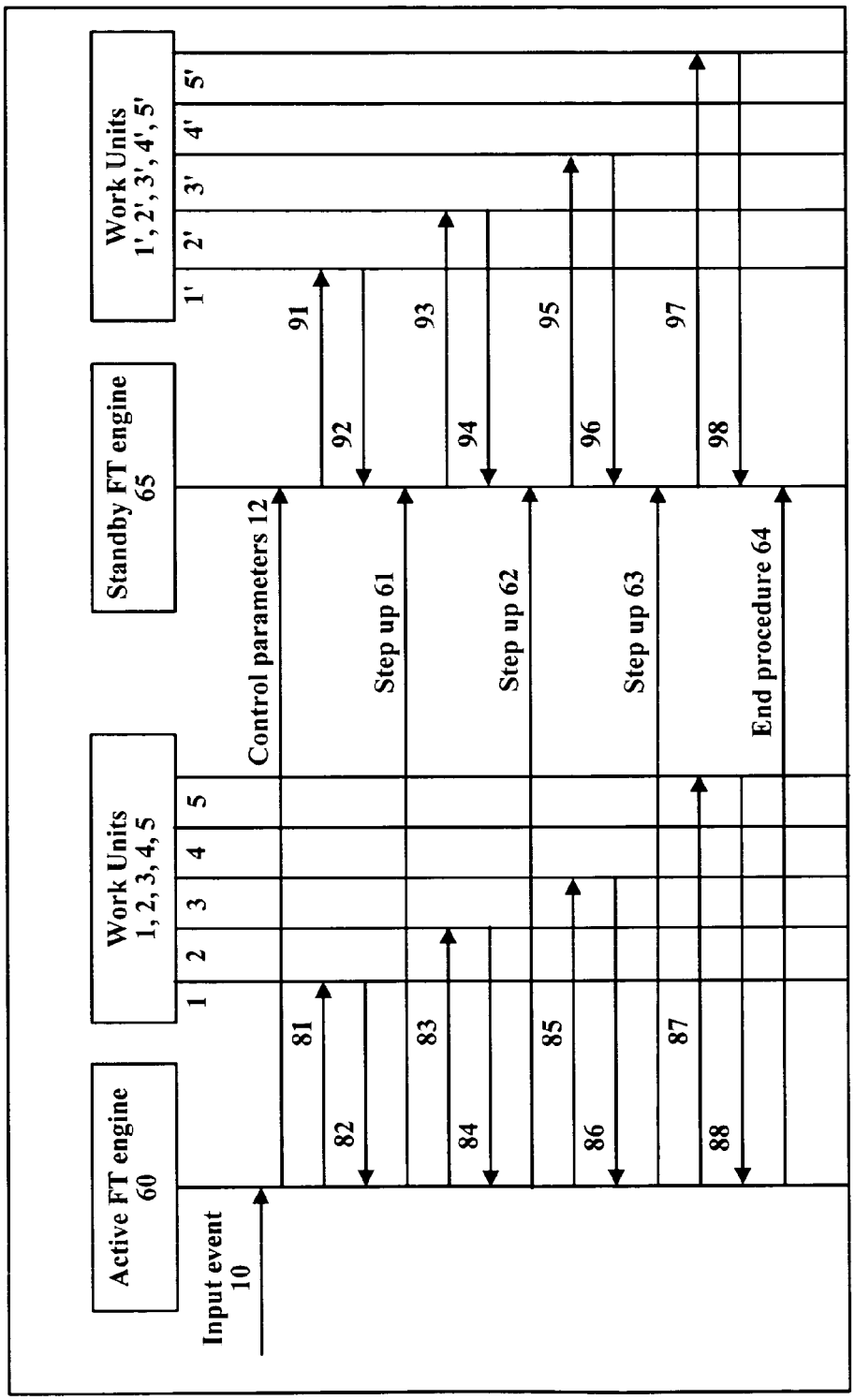
FIG. 3 illustrates one embodiment of lock-step execution performed by the fault tolerant system shown in FIG. 2.

FIG. 3 illustrates one embodiment of lock-step execution performed by fault tolerant system 100 shown in FIG. 2. Work units 1, 2, 3, 5 and corresponding work units 1', 2', 3', 5' are carried out in lock step execution with the invocation of procedures 30, 30' due to the receipt of input invent 10. Active FT engine 60 starts the procedure by invoking the first work unit of procedure corresponding to the input event. Therefore, input event 10 causes first work unit 1 of procedure 30 to be executed at the active FT engine side, as represented by arrow 81 in FIG. 3. Input event 10 also causes control parameters 12 to be sent to standby FT engine 65. Control parameters 12 in turn trigger the execution of first work unit 1' of procedure 30' at the standby FT engine side, as represented by arrow 91. When the execution of the first work unit 1 of the procedure 30 is completed, a signal is sent back to active FT engine 60 to inform it of the completion, as represented by arrow 82. Similarly, when the execution of the first work unit 1' of the procedure 30' is completed, a signal represented by arrow 92 is sent back to the standby FT engine 65 to inform it of the completion.

Standby FT engine 65 does not proceed to execute the next work unit 2' until a "step up" signal is received from the active FT engine side. The "step up" signal is not sent from active FT engine 60 until active FT engine 60 receives the signal represented by arrow 82, signaling that execution of the first work unit 1 is completed (i.e., there is no fault in carrying out part of the procedure 30 represented by work unit 1). Upon receipt of the signal represented by arrow 82, active FT engine 60 sends a "step up" signal/message 61 to its standby counterpart, informing standby FT engine 65 to proceed to the next work unit 2' of the procedure 30'. Thus, on completing the execution of the first work unit 1' on the standby side, standby FT engine 65 does not proceed to execute the next work unit 2' until a "step up" signal is received. After active FT engine 60 sends a "step up" signal/message 61 to the standby FT engine side, it proceeds to execute the second work unit 2 in the sequence. This is represented by arrow 83. Similarly, after the receipt of the "step up" signal/message 61, standby FT engine 65 is able to proceed to execute the second work unit 2' in the series, as represented by arrow 93. When the execution of the second work unit 2' is completed, this fact is relayed to standby FT engine 65, as represented by arrow 94. However, standby FT engine 65 waits for a "step up" signal/message 62 before it proceeds to execute the next work unit 3' in the series. The "step up" signal/message 62 is sent from active FT engine 60 upon the completion of the second work unit 2 in the series on the active application side, as represented by arrow 84.

This lock-step process between the work units of the active and standby copies of the procedures 30, 30' is continued until the procedures end. In this case, the third work units 3, 3' are executed and completed in the lock-step fashion, as represented by the step up signal/message 62, arrows 85, 86 on the active side, and arrows 95, 96 on the standby side. Likewise, the fourth work units 5, 5' are executed and completed in the lock-step fashion, as represented by the step up signal/message 63, arrows 87, 88 on the active side, and arrows 97, 98 on the standby side. Since work units 5, 5' are the last work units for the particular procedures, the procedures 30, 30' end. An "end procedure" signal/message 64 is sent from the active FT engine 60 to the standby FT engine 65, informing the standby FT engine 65 that the procedure 30' has now been completed.

Using the lock-step process described above, all work units of all procedures are executed in lock step between the active and standby copies of the application. Since both copies of the application are executing the procedure, both copies will be in perfect sync with one another with respect to their internal state information.

As part of execution of the work units, the active and standby copies may be performing database updates to reflect their current internal states. Since the same set of work units are executed at the active and standby copies of the application, the database at both copies are also in lock step synchronization.

In addition, on failure of the active copy, the standby copy is asked by the system management framework to assume the active role. On assuming active role, the application can, in order to take the application to a sane and stable state, either continue the operation and complete the procedure, or perform rollback recovery by rolling back all work units executed to this point and undo the database updates thereby taking the application to a state, which existed before starting the procedure.

A rolling upgrade of fault tolerant software applications requires that upgraded and non-upgraded copies of the application co-exist in the system when the upgrade version of the software is being validated for performance. This leads to the following issues with applications using a hot standby mechanism for fault tolerance:

The upgraded software executing may generate a different number and sequence of work units for the same procedure; and The database updates generated by the upgraded software may be different from that generated by the non-upgraded software.

These issues can lead to the following faults when a rolling upgrade is attempted for applications using a hot standby mechanism for fault tolerance:

The lock step synchronization between the active and standby copies of the application is broken since the number of work units generated for the procedure at the upgraded and non-upgraded are different;

Rollback recovery on active copy failure may be flawed since the work units executed at the upgraded copy of the application may be different from that executed at the non-upgraded copy; and Database updates at the active and standby copies of the application may not be identical, leading to each copy of the application assuming a different state.

Figure 4:
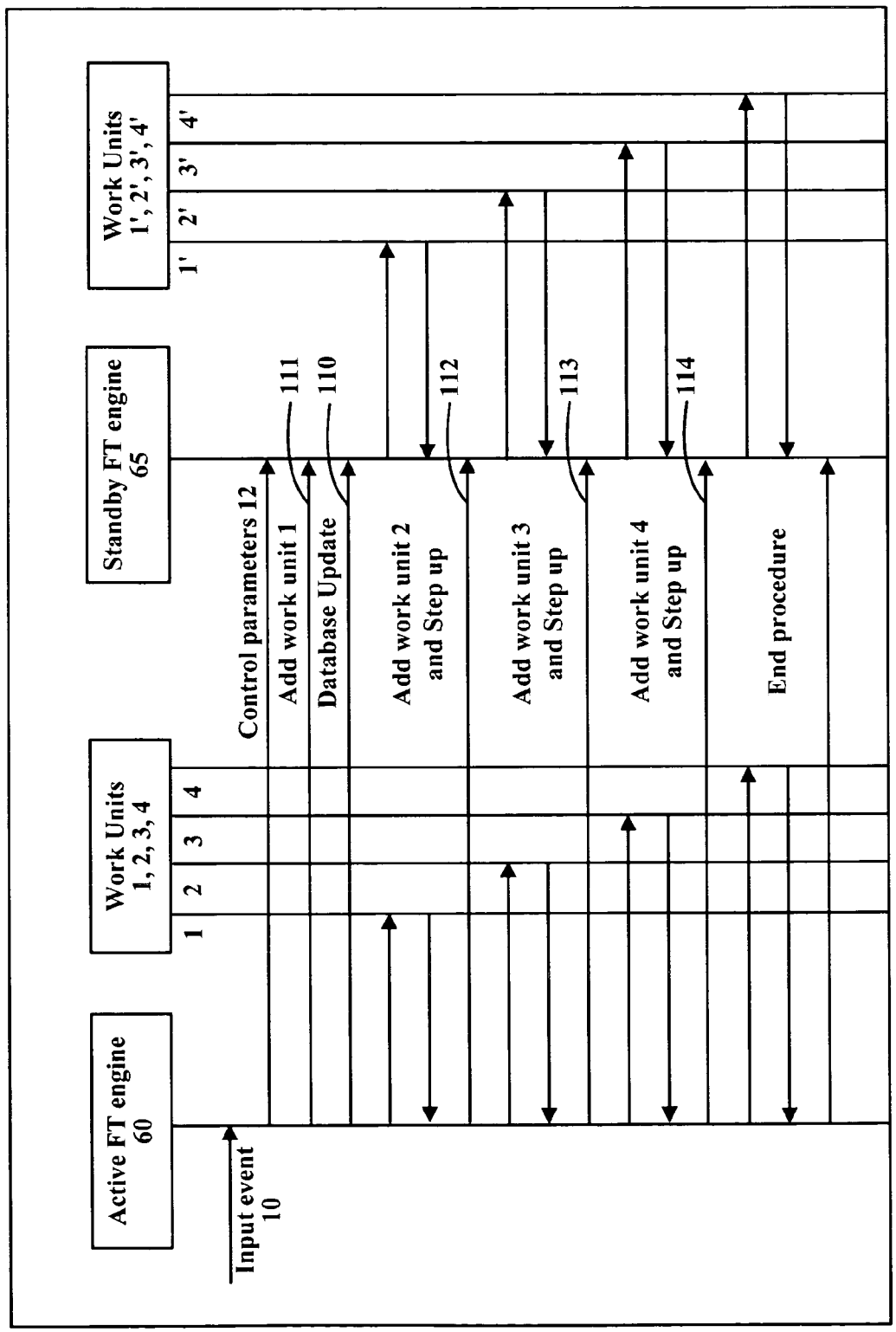
FIG. 4 illustrates a method in accordance with one embodiment of the present invention for performing rolling upgrades of applications using hot standby mechanism for fault tolerance while maintaining lock step synchronization between active and standby applications.

FIG. 4 illustrates a method in accordance with one embodiment of the present invention for performing rolling upgrades of applications using hot standby mechanism for fault tolerance while maintaining lock step synchronization between active and standby applications. In the embodiment shown, each procedure implemented by the application is versioned, and the active and standby copies of the application exchange the procedure version numbers as part of the initialization sequence.

If the version number of an active copy of a procedure is different from that of the standby copy, the standby copy of the application does not register work units for that procedure with standby FT engine 65. Active FT engine 60 sends the description of the registered work units at the active FT engine 60 to be copied to standby FT engine 65.

Active FT engine 60 sends all database activities performed by the active copy of the application to the standby copy if the procedure version numbers are different. The database activity is sent as an update message indicating the database operation performed at the active copy and the parameters used by the active copy to perform these operations. The standby copy of the application then performs database updates using these update messages.

As shown in FIG. 4, active FT engine 60 sends a description of work units 1–4 to standby FT engine 65 via arrows 111–114 with the step-up signal, when the procedure versions implemented by the application at the active copy is different from that at the standby copy. The standby copy registers these work units with standby FT engine 65 instead of generating the work units independently. Active FT engine 60 also sends database updates via arrow 110 for all database activities performed at the active copy. Otherwise, the lock step synchronization for the rolling upgrade of FIG. 4 operates similarly to the lock step synchronization shown in FIG. 3.

Figure 5:
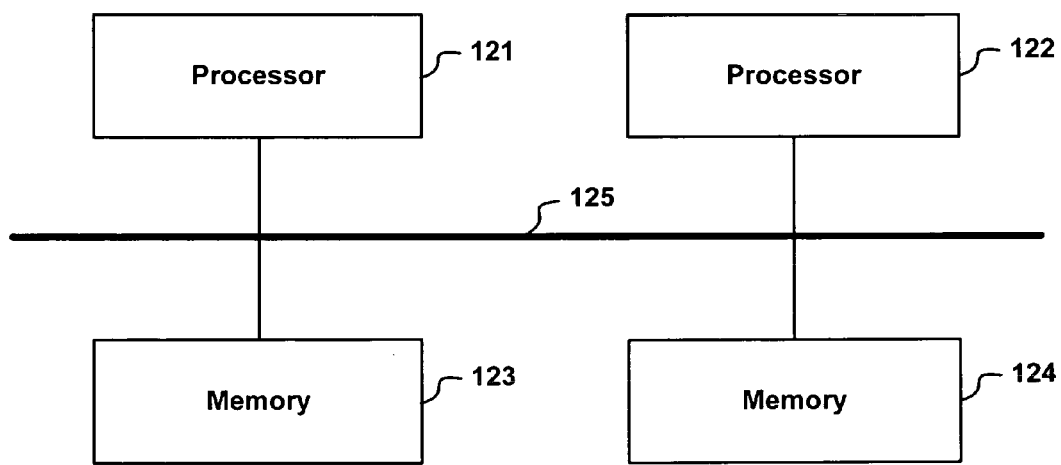
FIG. 5 is a block diagram of a computer system in accordance with one embodiment of the present invention.

FIG. 5 is a block diagram of a computer system 120 in accordance with one embodiment of the present invention. Computer system 120 includes processors 121, 122. Processors 121, 122 can be any type of general purpose processors. Processors 121, 122 are coupled to a bus 125. Also coupled to bus 125 are memories 123, 124. Memories 123, 124 are any type of memories or computer readable medium capable of storing instructions that can be executed by processors 121, 122. In one embodiment, processors 121, 122 implement active FT engine 60 and standby FT engine 65, respectively, shown in FIGS. 2–4. In other embodiments, a single processor (e.g., processor 121) implements both active FT engine 60 and standby FT engine 65.

Figure 6:
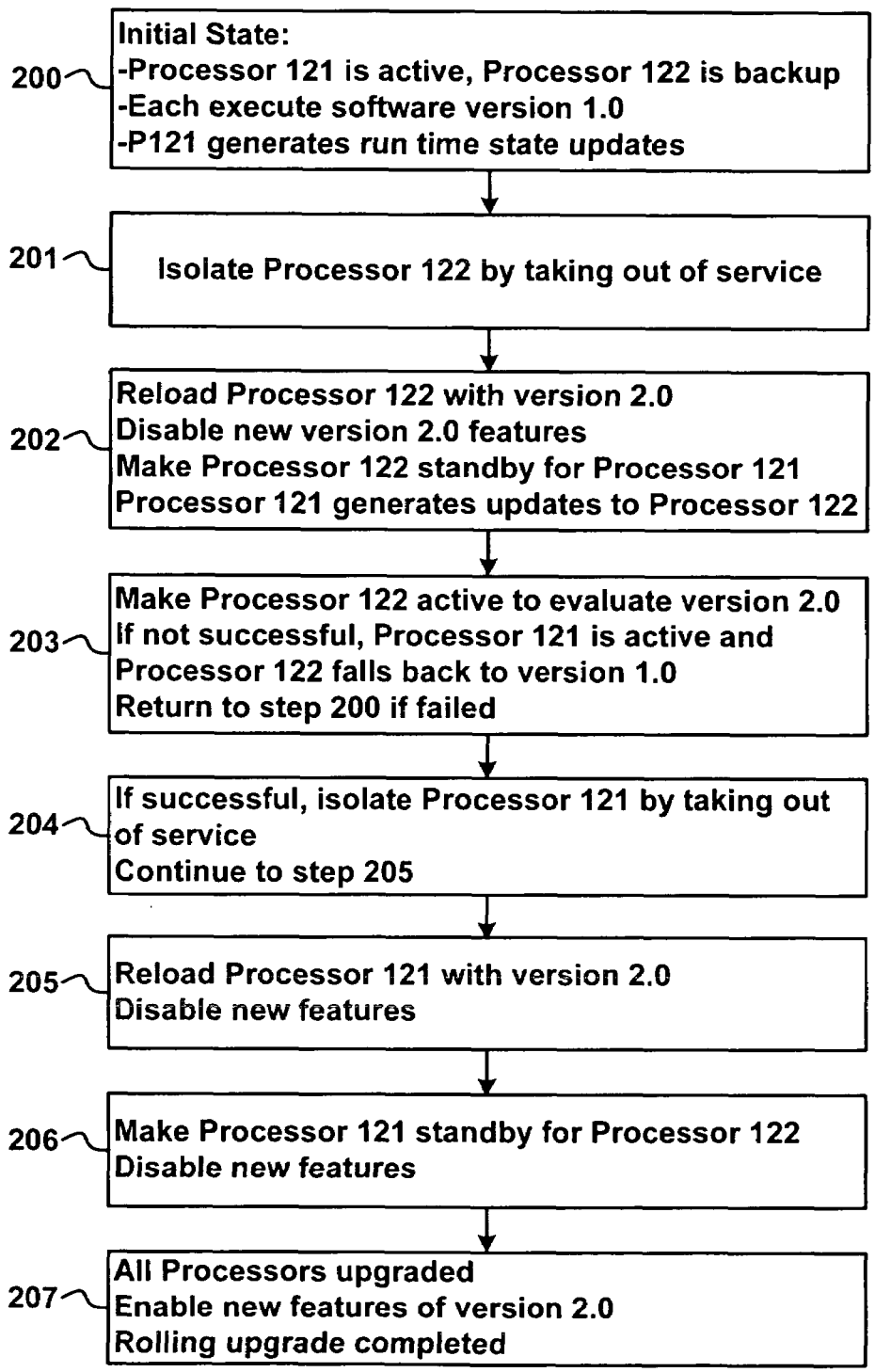
FIG. 6 is a flow chart illustrating steps performed in accordance with one embodiment of the present invention for implementing rolling upgrades of a computer system.

FIG. 6 is a flow chart illustrating steps performed in accordance with one embodiment of the present invention for implementing rolling upgrades of computer system 100. In the embodiment described, software is upgraded from "Version 1.0" to "Version 2.0". In the embodiment described, the steps are stored as software in memories 123, 124 and executed by processors 121, 122. In other embodiments, the steps are performed by any combination of hardware or software.

At step 200, computer system 100 is in an initial state. In this state, processor 121 is an active processor and processor 122 is a standby processor acting as a backup to processor 121. Processors 121, 122 each execute Version 1.0 of the software to be upgraded. Processor 121 keeps processor 122 in synchronization by generating run time state updates such as described in FIG. 4. The rolling upgrade is intended to upgrade system 100 of software Version 2.0.

At step 201, processor 122 is isolated by taking it out of service.

At step 202, processor 122 is reloaded with Version 2.0 of the software. However, the new features in the Version 2.0 software are disabled. Processor 122 is then integrated into system 100 by being made a standby for processor 121. Processor 121 generates run time state updates to processor 122.

At step 203, processor 122 is made the active processor in order to evaluate Version 2.0 of the software. The new features in the Version 2.0 remain disabled. If the software Version 2.0 does not perform acceptably, processor 121 is made the active processor and processor 122 is isolated by taking it out of service, leading to a fallback of Version 1.0 for computer system 100. System 100 is returned to step 200.

At step 204, if the evaluation was successful, processor 121 is isolated by taking it out of service. System 100 continues to step 205.

At step 205, processor 121 is reloaded with software Version 2.0. The new features in Version 2.0 of processor 121 are disabled.

At step 206, processor 121 is integrated back into system 100 by making it a standby for processor 122. The new features in Version 2.0 continue to be disabled.

At step 207, all processors in system 100 have been upgraded, and the new features of software Version 2.0 are then enabled. The rolling upgrade is now completed.

As described, the rolling upgrade method in accordance with one embodiment of the present invention allows the upgraded version to be validated, yet retains the fault tolerance quality of the software throughout the upgrade process. This allows portable software products to be upgraded on fault tolerant systems.

Several embodiments of the present invention are specifically illustrated and/or described herein. However, it will be appreciated that modifications and variations of the present invention are covered by the above teachings and within the purview of the appended claims without departing from the spirit and intended scope of the invention.

What is claimed is:

1. A method of upgrading application software on a fault tolerant system having a first engine and a second engine, the first and second engine executing an application, the method comprising:

taking the second engine out of service;

upgrading the application on the second engine;

assigning the second engine as a standby engine to the first engine and receiving run state updates from the first engine;

assigning the first engine as the standby engine to the second engine and receiving run state updates from the second engine; and upgrading the application on the first engine.

2. The method of claim 1, wherein said upgrading the application on the second engine comprises disabling new features of the upgraded application.

3. The method of claim 1, wherein said upgrading the application on the first engine comprises disabling new features of the upgraded application.

4. The method of claim 1, further comprising enabling new application features on the first and second engine.

5. The method of claim 1, wherein said assigning the first engine as a standby to the second engine comprises determining if the upgraded software is acceptable.

6. The method of claim 5, wherein if said upgraded software is not acceptable, assigning the first engine as an active engine.

7. The method of claim 5, wherein if said upgraded software is acceptable, taking the first engine out of service.

8. The method of claim 1, wherein the application comprises at least one work unit.

9. The method of claim 8, wherein the run state updates comprise a description of the at least one work unit.

10. The method of claim 8, wherein said first engine and second engine operate in synchronization.

11. A fault tolerant system comprising:

a first engine;

a second engine;

a computer readable memory that stores instructions that when executed by said first and second engine cause the fault tolerant system to:

designate said first engine as an active engine and said second engine as a standby engine;

determine if said active engine and said standby engine are executing different versions of an application software;

designate said first engine as an standby engine to the second engine and receive run state updates from the second engine;

upgrade the application on the first engine.

12. The system of claim 11, said instructions further causing said first and second engine to:

register the work units at the standby engine.

13. The system of claim 11, said instructions further causing said first and second engine to:

send a step-up signal from the active engine to the standby engine with a description of work units.

14. The system of claim 11, wherein the application software comprises work units.

15. The system of claim 11, said instructions further causing said first and second engine to: send a description of work units from said active engine to said standby engine.

16. The system of claim 11, said instructions further causing said first and second engine to: send database activities from said active engine to said standby engine.

* * * * *